United States Patent
Dhanapal et al.

(10) Patent No.: US 10,805,823 B2
(45) Date of Patent: Oct. 13, 2020

(54) DEVICE, SYSTEM, AND METHOD FOR ENHANCED USER EQUIPMENT AND NETWORK CAPABILITY FOR LTE AND NEW RADIO

(71) Applicant: APPLE INC., Cupertino, CA (US)

(72) Inventors: Muthukumaran Dhanapal, Dublin, CA (US); Srinivasan Nimmala, San Jose, CA (US); Srirang A. Lovlekar, Cupertino, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/719,785

(22) Filed: Sep. 29, 2017

(65) Prior Publication Data

US 2019/0104432 A1    Apr. 4, 2019

(51) Int. Cl.
| | |
|---|---|
| *H04W 72/04* | (2009.01) |
| *H04W 28/02* | (2009.01) |
| *H04W 8/24* | (2009.01) |
| *H04W 76/10* | (2018.01) |
| *H04W 76/50* | (2018.01) |
| *H04W 16/14* | (2009.01) |

(52) U.S. Cl.
CPC ......... *H04W 28/0215* (2013.01); *H04W 8/24* (2013.01); *H04W 76/10* (2018.02); *H04W 76/50* (2018.02); *H04W 16/14* (2013.01)

(58) Field of Classification Search
CPC . H04W 28/0215; H04W 76/10; H04W 76/50; H04W 8/24
See application file for complete search history.

(56) References Cited

U.S. PATENT DOCUMENTS

| | | | |
|---|---|---|---|
| 2015/0173094 A1* | 6/2015 | Vangala | H04W 72/10 370/329 |
| 2015/0264637 A1* | 9/2015 | Zaus | H04W 48/16 455/434 |
| 2015/0327269 A1* | 11/2015 | Kim | H04W 72/0453 370/329 |

(Continued)

FOREIGN PATENT DOCUMENTS

| | | | | |
|---|---|---|---|---|
| WO | WO-2018039974 A1 * | 3/2018 | | H04Q 28/06 |
| WO | WO-2018182972 A1 * | 10/2018 | | H04W 4/90 |

*Primary Examiner* — Hassan Kizou
*Assistant Examiner* — Mahbubul Bar Chowdhury
(74) *Attorney, Agent, or Firm* — Fay Kaplun & Marcin, LLP

(57) ABSTRACT

A device and method for generating a user equipment (UE) capability information message. In a first embodiment, a UE receives a request for the radio access capabilities of the UE and a size limit indication for a message to be generated by the UE that includes the radio access capabilities. The UE generates the message that includes the radio access capabilities based on the size limit then transmits the message to the network. In a second embodiment, a UE receives a request for the radio access capabilities of the UE. The UE also receives a segment limit indication and a size limit indication for a message to be generated by the UE that includes the radio access capabilities. The UE generates the message where the message includes a plurality of segments based on the segment limit. Subsequently, the UE transmits the message to the network.

20 Claims, 7 Drawing Sheets

(56) References Cited

U.S. PATENT DOCUMENTS

| | | | |
|---|---|---|---|
| 2016/0057662 A1* | 2/2016 | Persson | H04W 8/24 |
| | | | 455/436 |
| 2016/0157172 A1* | 6/2016 | Jeong | H04W 76/14 |
| | | | 370/329 |
| 2016/0262053 A1* | 9/2016 | Palm | H04L 5/001 |
| 2017/0111910 A1* | 4/2017 | Sundar | H04W 72/0453 |
| 2017/0367073 A1* | 12/2017 | Murugan | H04B 1/0053 |
| 2018/0049213 A1* | 2/2018 | Gholmieh | H03D 7/16 |
| 2018/0070250 A1* | 3/2018 | Venkataraman | H04W 24/04 |
| 2018/0206113 A1* | 7/2018 | He | H04W 8/24 |
| 2018/0227904 A1* | 8/2018 | Raghunathan | H04W 8/22 |

* cited by examiner

DEVICE, SYSTEM, AND METHOD FOR ENHANCED USER EQUIPMENT AND NETWORK CAPABILITY FOR LTE AND NEW RADIO

BACKGROUND INFORMATION

A user equipment (UE) may be configured to establish a connection to at least one of a plurality of different networks or types of networks to perform a variety of different functionalities via the network connection. When establishing the network connection, the network requests that the UE provides UE capability information. The UE capability information may indicate the radio access capabilities of the UE to the network. In response to the request, the UE provides the UE capability information to the network. The UE capability information may allow the network to provide the UE with relevant services.

However, portions of the network infrastructure may be unable to process UE capability information that exceeds a certain size limit. For instance, network infrastructure with an inadequate buffer size may be unable to successfully process UE capability information that exceeds a certain size. Inability to process the UE capability information leads to a poor user experience due to problems such as attach failures and call drops. Conventionally, the UE is unaware of any limits with regard to the size of the UE capability information that the network can successfully process. This often causes the UE to generate and transmit a UE capability information message that the network cannot process.

SUMMARY

A method to be performed by a user equipment (UE). The method includes receiving a request from the network for radio access capabilities of the UE. The method further includes receiving, from the network, a size limit indication corresponding to a message to be generated by the UE that includes the radio access capabilities of the UE. The method further includes generating the message that includes the radio access capabilities of the UE based on the size limit and transmitting the message to the network.

A user equipment (UE) having a processor configured to receive a request from the network for the radio access capabilities of the UE, receive from the network a size limit indication corresponding to a message to be generated by the UE that includes the radio access capabilities of the UE and generate the message that includes the radio access capabilities of the UE based on the size limit. The UE also has a transceiver configured to transmit the message to the network.

A method to be performed by a user equipment (UE). The method includes receiving a request from the network for radio access capabilities of the UE. The method further includes receiving a segment limit indication and a size limit indication for a message to be generated by the UE that includes the radio access capabilities of the UE. The method further includes generating the message that includes the radio access capabilities of the UE where the message includes a plurality of segment based on the segment limit and the size limit. The method further includes transmitting the message to the network.

A user equipment (UE) having a processor configured to receive a request from the network for the radio access capabilities of the UE, receive a segment limit indication and a size limit indication for a message to be generated by the UE that includes the radio access capabilities of the UE and generate the message that includes the radio access capabilities where the message includes a plurality of segments based on the segment limit and the size limit. The UE also has a transceiver configured to transmit the message to the network.

DETAILED DESCRIPTION

Figure 1:
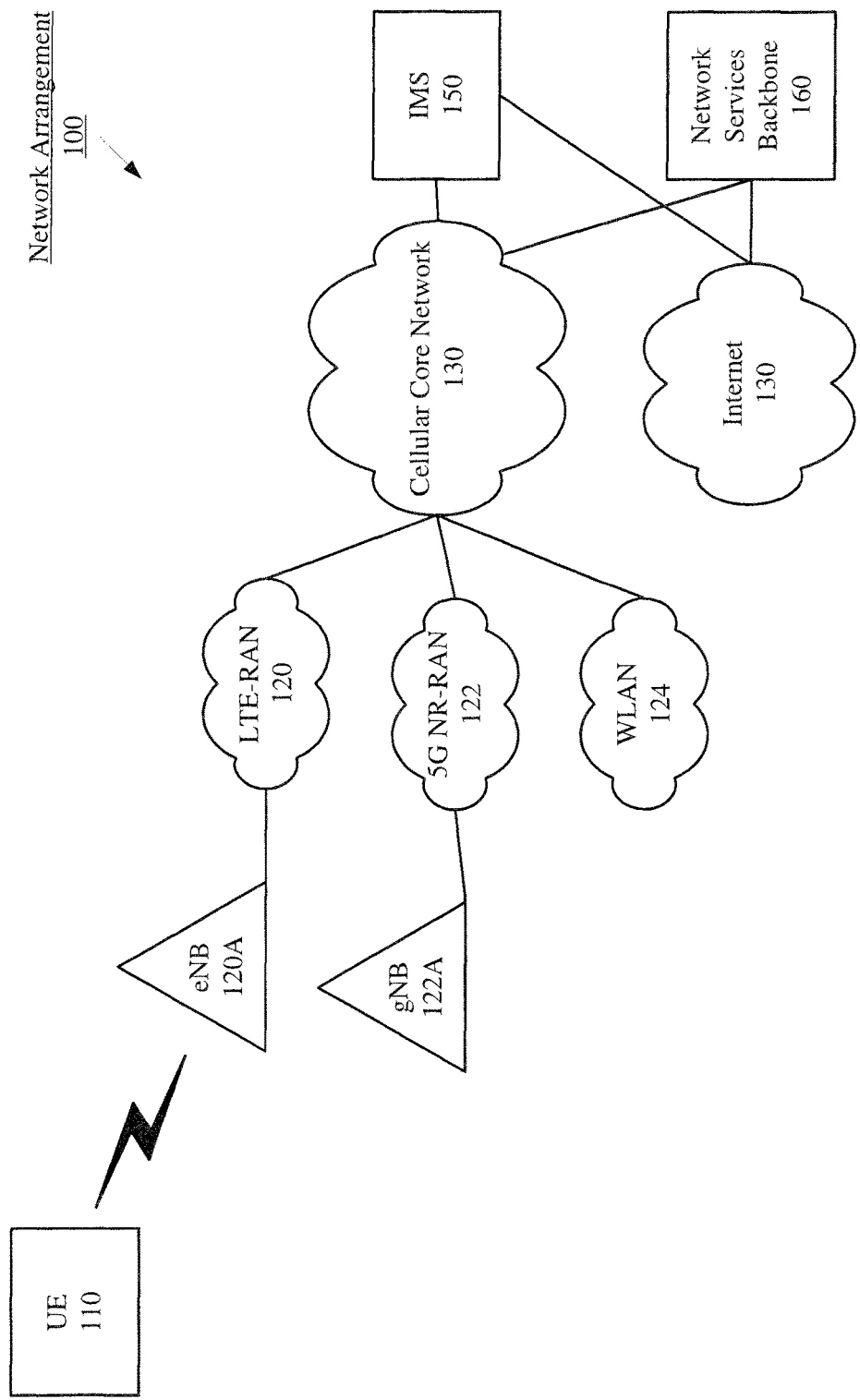
FIG. 1 shows a network arrangement according to various exemplary embodiments described herein.

The exemplary embodiments may be further understood with reference to the following description and the related appended drawings, wherein like elements are provided with the same reference numerals. The exemplary embodiments are related to a device, system, and method for restricting the size of a user equipment (UE) capability information message transmitted to a network to which the UE is connected. A person of ordinary skill in the art would understand that a UE capability information message may contain data that corresponds to the radio access capabilities of the UE. Conventionally, the UE is unaware of the network's limitations with regard to the size of the UE capability information message that the network can successfully process and this may lead to the UE transmitting a UE capability information message that is greater than the size of a UE capability information message that the network can successfully process. When this occurs, problems such as attach failures and call drops may arise which lead to a poor user experience. The Exemplary embodiments described herein address these deficiencies.

Initially, it is noted that the exemplary embodiments are described with regard to a UE. However, the use of a UE is merely for illustrative purposes. The exemplary embodiments may be utilized with any electronic component that may establish a connection with a network and configured with the hardware, software, and/or firmware to exchange information and data with the network. Therefore, the UE as described herein is used to represent any electronic component.

Further, it is noted that some of the exemplary embodiments are described with regard to the network being a LTE network and the base station of the network being an eNB. However, reference to the LTE network and the eNB is merely for illustrative purposes. Other exemplary embodiments are described with regard to the network being a 5G NR network and the base station of the network being a gNB. However, reference to the 5G NR network and the gNB is merely for illustrative purposes. Those skilled in the art would understand that the network may be any network type of network configured to exchange data with the UE and the base station may be any type of base station within the corresponding network.

Successfully connecting to and actively participating in a network via a particular base station may include an exchange of data between a UE and the particular base station prior to the UE being able to successfully utilize services offered by the network via the particular base station. This exchange of data may occur via a variety of different mechanisms. For example, the exemplary embodiments are described with regard to the Media Access Control (MAC) layer. The MAC layer may be used to exchange control information between the UE and the network to facilitate, in part, the scheduling of subsequent communication between the UE and the network. The control information transported via the MAC layer may be referred to as a MAC control element (CE). However, any reference to the MAC layer or MAC CE is merely for illustrative purposes. The exemplary embodiments are not limited to the use of the MAC layer or MAC CEs and instead, the exemplary embodiments may utilize any suitable means to facilitate the exchange of control information between the UE and the network.

Additionally, the exemplary embodiments are described with regard to Radio Resource Control (RRC) protocols. The RRC protocols may be used to exchange data between the UE and the network including data related to the Access Stratum (AS) and Non-Access stratum (NAS). It is important to note that RRC protocol is used for the exchange of a wide variety of information and is not limited to AS and NAS related data. Data exchanged via RRC protocol may be referred to as RRC messages, System Information (SI), a System Information Block (SIB), a particular SIB type or an Information Element (IE). However, the exemplary embodiments are not limited to the use of the RRC protocol, RRC messages, SI, SIB or IE and the exemplary embodiments may utilize any suitable means to facilitate the exchange of information between the UE and the network.

Regarding the RRC protocol, the exemplary embodiments may be described with regard to the transmission and reception of a UE capability enquiry message and a UE capability information message. It is important to note that the UE capability enquiry message and the UE capability information message may each be an individual RRC message. Alternatively, the UE capability enquiry message and the UE capability information message may each constitute a plurality of RRC messages or be included as part of a further message exchanged between the UE and the base station. As will be described below, the UE capability enquiry message may be a transmission from the network to the UE that requests that the UE provide to the network an indication corresponding to the radio access capabilities of the UE. The UE capability information message may be a transmission from the UE to the network that indicates to the network the radio access capabilities of the UE. However, it should be noted that reference to the UE capability enquiry message and the UE capability information message are merely for illustrative purposes because different networks and different providers may refer to request for the radio access capabilities of the UE and the response of the radio access capabilities corresponding to the UE in a variety of different ways.

It should be further noted that reference to UE capability information is just an example. The exemplary embodiments may apply to other types of information or information elements (IEs). Accordingly, the exemplary embodiments may apply to any type of information that is transmitted by a UE to the network where the UE is unaware of a size limit corresponding to an amount of information that the network infrastructure can successfully process during the establishment of the connection between the UE and the network.

FIG. 1 shows an exemplary network arrangement 100 according to the exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate directly with one or more networks. In the example, the networks with which the UE may wirelessly communicate are a LTE radio access network (LTE-RAN) 120, a 5G New Radio (NR) radio access network (5G NR-RAN) 122 and a wireless local access network (WLAN) 124. However, it should be understood that the UE 110 may also communicate with other types of networks and the UE 110 may also communicate with networks over a wired connection. With regard to the exemplary embodiments, the UE 110 may establish a connection with the LTE-RAN 120. Alternatively, the UE 110 may establish a connection with the 5G NR-RAN 122. Therefore, the UE 110 may have both a LTE chipset to communicate with the LTE-RAN 120 and a 5G NR chipset to communication with the 5G NR-RAN 122. It should be noted that the use of the LTE-RAN 120 and the 5G NR-RAN 122 is merely for illustrative purposes and the exemplary embodiments may relate to any type of network where it is possible for the UE 110 to transmit a UE capability information message that exceeds a size that the network can successfully process.

The LTE-RAN 120 and the 5G NR-RAN 122 are portions of cellular networks that may be deployed by cellular providers (e.g., Verizon, AT&T, Sprint, T-Mobile, etc.). These networks 120 and 122 may include, for example, base stations (Node Bs, eNodeBs, HeNBs, eNBS, gNBs, gNodeBs, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the LTE-RAN 120 via an evolved Node B (eNB) 120A. Those skilled in the art will understand that any association procedure may be performed for the UE 110 to connect to the LTE-RAN 120. For example, as discussed above, the LTE-RAN 120 may be associated with a particular cellular provider where the UE 110 and/or the user thereof has a contract and credential information (e.g., stored on a SIM card). Upon detecting the presence of the LTE-RAN 120, the UE 110 may transmit the corresponding credential information to associate with the LTE-RAN 120. More specifically, the UE 110 may associate with a specific access point (e.g., the eNB 122A of the LTE-RAN 122). As mentioned above, the use of the LTE-RAN 122 is for illustrative purposes and any type of network may be used. For example, the UE 110 may connect to the 5G NR-RAN 122 via the next generation Node B (gNB) 122A.

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
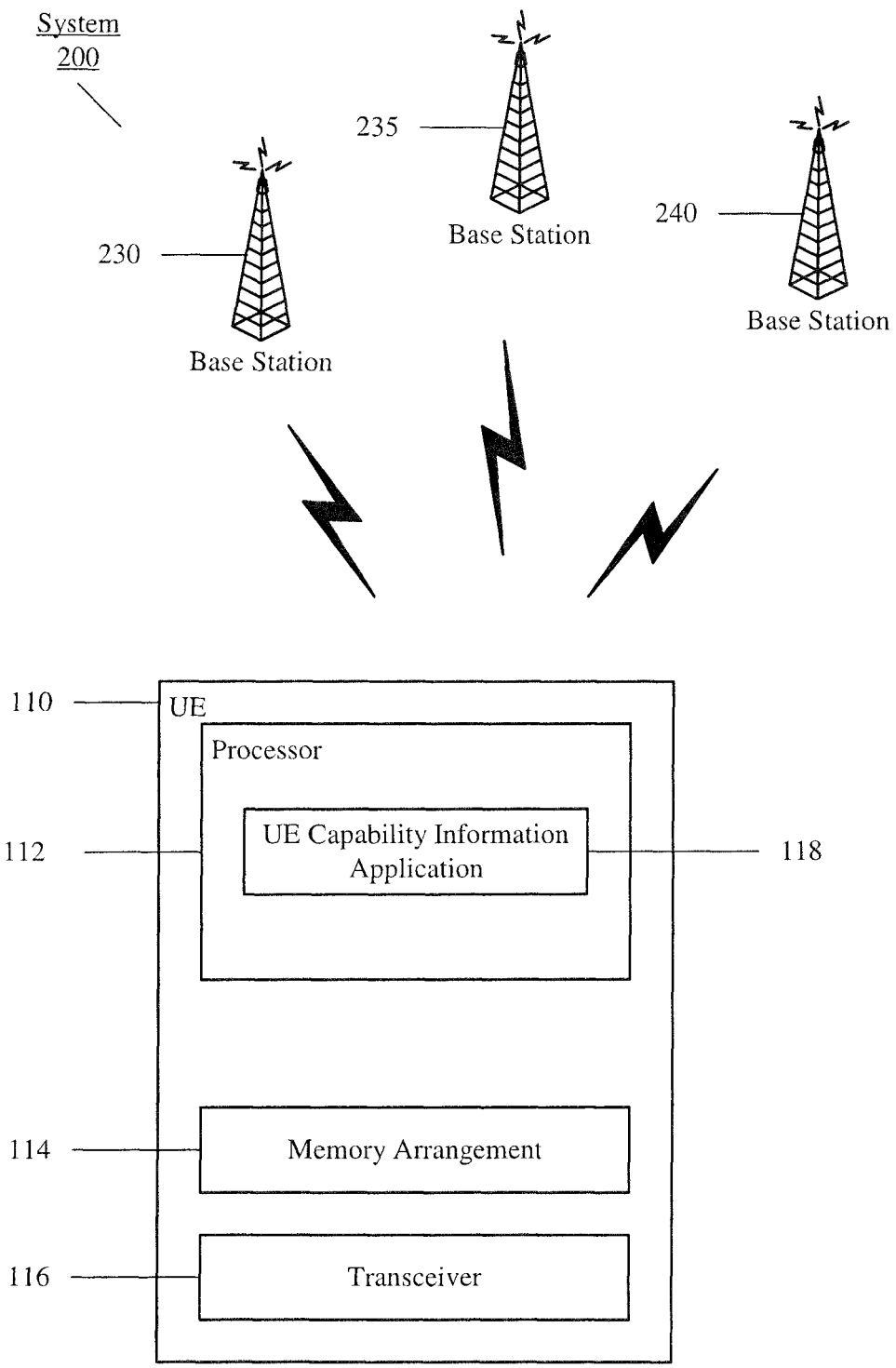
FIG. 2 shows a system where a user equipment restricts the size of the UE capability information message according to various exemplary embodiments described herein.

FIG. 2 shows an exemplary system 200 where the UE 110 restricts the size of the UE capability information message transmitted to the network according to various exemplary embodiments described herein. The system includes a UE 110 and a plurality of base stations 230, 235, 240. The UE 110 may associate with one of the base stations 230-240 such as base station 230 to join the network corresponding to the base station 230. As mentioned above, the UE 110 may include components that enable different radio access technologies (e.g. LTE, 5G NR). Therefore, the UE 110 may operate on a variety of different frequencies or channels (i.e., range of continuous frequencies). As the UE 110 is associated with the base station 230, the base station 230 may provide to the UE 110 a UE capability enquiry message and the UE 110 may provide to the base station 230 the UE capability information message. It should be noted that the network shown in the system 100 is only exemplary. For example, the number of base stations 230-240 that may be in communicative range of the UE 110 may be more or fewer than three.

It should be noted that the UE 110 may be carrier aggregation (CA) capable and the network (e.g. LTE, 5G NR, etc.) may have CA functionality. Accordingly, the UE capability information message transmitted to the network may include, but is not limited to, IEs related to CA. However, it should be noted that reference to CA is merely exemplary and neither the UE 110 nor the network is required to be able to execute CA related functions.

Those skilled in the art will understand that CA functionality may include a base station acting as the primary serving cell (PCell) and at least one further base station acting as a secondary serving cell (SCell). The PCell may control the mechanism used in exchanging data, particularly how data is transmitted to and received by the UE 110. When the UE 110 is CA capable, CA functionality enables the PCell and a SCell to combine bandwidths to exchange data with the UE 110. Thus, with CA, the PCell may provide a first portion of a total bandwidth for data to be exchanged while the SCell may provide a second portion of the total bandwidth. A PCell and a single SCell may be termed a double CA combination (two carriers) and may be utilized to provide the total available bandwidth. To further increase the total available bandwidth for data to be exchanged with the UE, an additional SCell may be incorporated. A PCell and two SCells may be termed a triple CA combination and may be utilized to provide the total available bandwidth. A PCell and three SCells may be termed a quadruple CA combination and may also be utilized to provide the total available bandwidth. The exemplary embodiments are described with regard to double, triple and quadruple CA combinations. However, those skilled in the art will understand that the exemplary embodiments may be modified for the PCell and any number of SCells to be used in the CA functionality.

Those skilled in the art would understand that License Assisted Access (LAA) is a type of CA where the SCell operates over the unlicensed spectrum. For example, a first base station may be a PCell that operates in the licensed spectrum and may provide a first bandwidth to the UE 110. A second base station may be the SCell that operates in the unlicensed spectrum and may provide a second bandwidth to the UE 110. Thus, the first base station utilizing the first bandwidth over the licensed band and the second base station utilizing the second bandwidth over the unlicensed band may provide the total available bandwidth for the UE 110. The LAA operations may be applicable to the uplink and the downlink.

Figure 3:
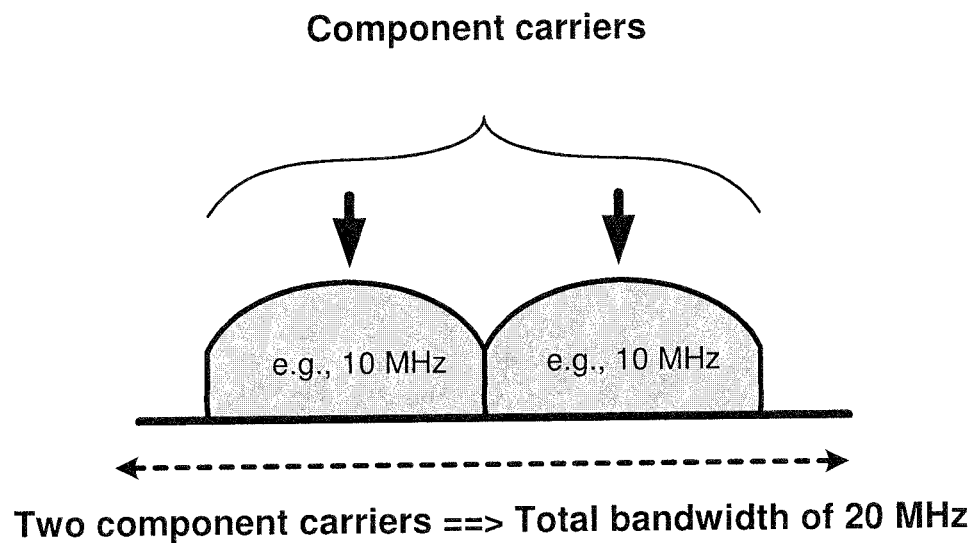
FIG. 3 shows an example of carrier aggregation.

Accordingly, the network may be a LTE network and the base stations 230-240 may be eNBs or the network may be a 5G NR network and the base stations 230-240 may be gNBs. Using CA functionality, the base station 130 may serve as the PCell while the base stations 235, 240 may serve as the at least one SCell. FIG. 3 shows an example of carrier aggregation. As shown in FIG. 3, the PCell may provide a first component carrier of 10 MHz representing a primary component carrier (PCC) operating on a first frequency band while the SCell may provide a second component carrier of 10 MHz representing the secondary component carrier (SCC) operating on a second frequency band. It should be noted that FIG. 3 only demonstrates one type of carrier aggregation. Specifically, FIG. 3 shows the two component carriers in an intra-band carrier aggregation with continuous component carriers. However, those skilled in the art will understand that other types of carrier aggregation may also be used such as intra-band carrier aggregation with non-continuous component carriers, inter-band carrier aggregation, or any combination of these three types. Furthermore, those skilled in the art will understand that other bandwidths may be used such as 1.4, 3, 5, 15, or 20 MHz and typically a maximum of five component carriers may be aggregated. Again, when only one SCell is utilized, a double CA combination arrangement may be used whereas when two SCells are utilized, a triple CA combination arrangement may be used, etc. As illustrated in FIG. 3, two component carriers each having a bandwidth of 10 MHz may be combined for a total bandwidth of 20 MHz.

Returning to FIG. 2, The UE 110 may include a processor 112, a memory arrangement 114, and a transceiver 116. However, the UE 110 may also include further components (not shown) such as a display device, an input/output (I/O) device, and other components such as a portable power supply, an audio I/O device, etc.

The processor 112 may be configured to execute a plurality of applications of the UE 110. For example, if the UE 110 is CA capable and the network has CA functionality (e.g. LTE network, 5G NR network) the UE 110 may advertise supported CA combinations. When advertising CA combinations, the UE 110 may perform measurements for all available CA combinations. Accordingly, the processor may be configured to execute an application that performs CA related measurements and subsequently generates a CA advertisement. The applications may also include a UE capability information application 118. The UE capability information application 118 may be configured to determine whether the UE 110 has received a UE capability enquiry message from the network. Further, the UE capability information application 118 may be configured to determine whether the network has provided any limitations corresponding to the size or contents of the UE capability information message that the network has requested from the UE 110. The network may provide these limitations corresponding to the UE capability information message within the UE capability enquiry message or may provide these limitations in a different transmission. In response to the request for UE capability information and any corresponding limitations, the UE capability information application 118 may generate, for transmission to the network, a UE capability information message that is restricted in size based on the limitations provided from the network.

It should be noted that the functionality associated with the applications may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 112 is split among two processors, a baseband processor and an applications processor. The exemplary embodiments may be implemented in any of these or other configurations of a UE. For illustrative purposes, the processor 112 may be a baseband processor.

Figure 4:
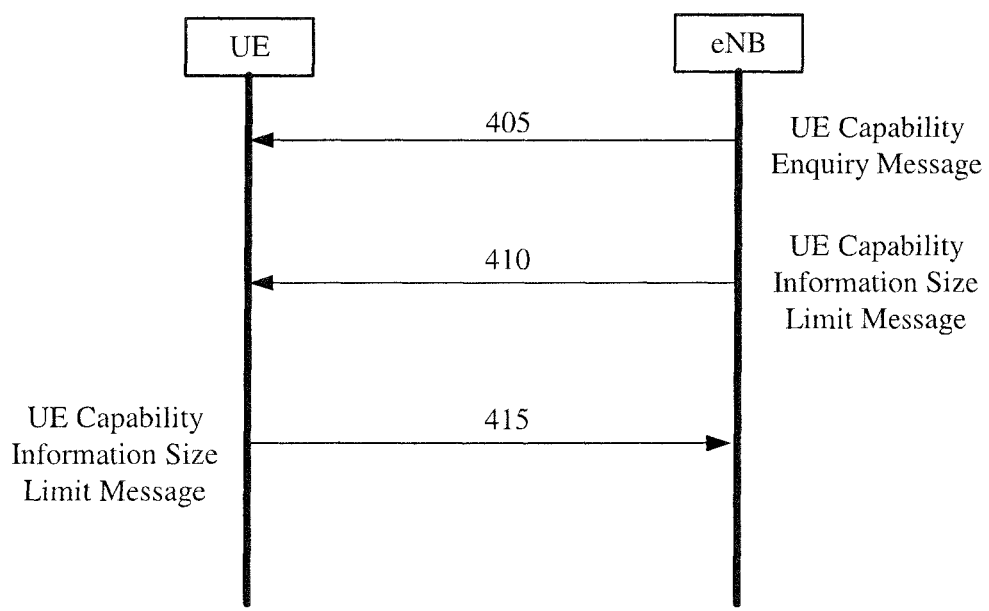
FIG. 4 shows a signaling diagram for restricting the size of the UE capability information message according to various exemplary embodiments described herein.
Figure 5:
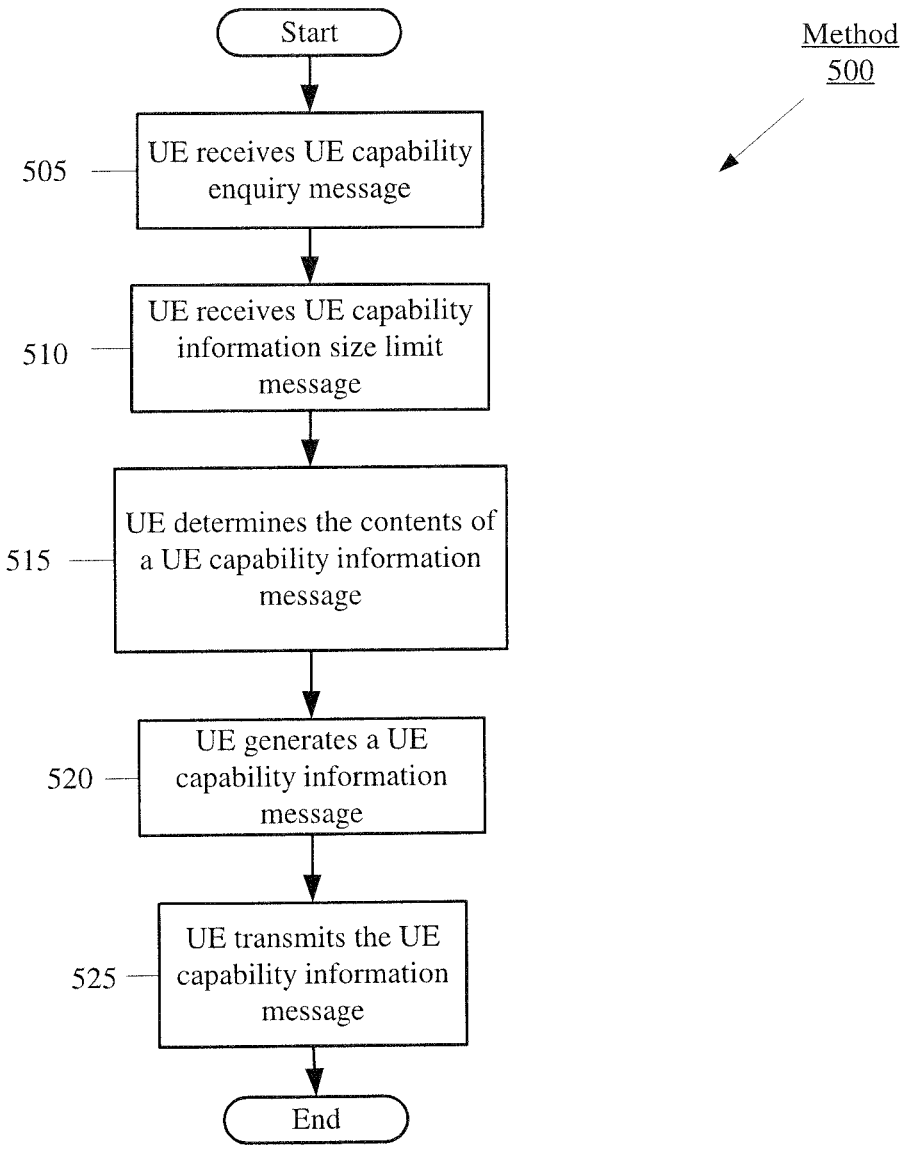
FIG. 5 shows a method for restricting the size of the UE capability information message according to various exemplary embodiments described herein.

As will be demonstrated below, FIG. 4 shows an exemplary signaling diagram 400 and FIG. 5 shows a corresponding method 500 for restricting the size of the UE capability information message for when the UE 110 is associated with an eNB of an LTE network. However, reference to an LTE network is merely exemplary and the signaling diagram 400 and the method 500 may be performed when the UE 110 is associated with a gNB of a 5G NR network or any other type of network.

As mentioned above, the UE capability information message may be an RRC message and may include, but is not limited to, information indicating CA advertisements, information indicating CA advertisement related measurements and information indicating multiple input multiple output (MIMO) related features.

It should be noted that the UE 110 may have the ability to advertise a predefined maximum number of CA combinations to the network. For instance, the LTE Specification Release 11 TS 36.331 (e.g., 3GPP TS 36.331 V.11.0.0 and later) requires that the UE advertise all supported CA combinations up to a maximum of 128 CA combinations. However, it should be noted that the number of available advertising spots is only exemplary and is based on a specific LTE standard, the number may change over time as the LTE standard evolves and other types of networks (e.g. 5G NR) may utilize other numbers of advertising spots. Similarly, there may be an LTE Standard or a 5G NR Standard that sets a predefined maximum size (e.g. bytes, etc.) with regard to the UE capability information message that the UE may transmit to the network. However, despite the predefined size established in the Standards, the network infrastructure (e.g. eNB, gNB, etc.) may not be able to successfully process the predefined maximum size of the UE capability information message due to inadequacies of the network infrastructure. For instance, the base station that receives the UE capability information message may not possess an adequate buffer size, optimal hardware, optimal software, etc.

Conventionally, the UE is unaware of any inadequacies of network infrastructure that may prevent the network, via a particular base station, from being able to successfully process the UE capability information message. This may lead to a UE that generates and transmits a UE capability information message that is equal to the predefined maximum size of the UE capability information. Thus, the network, via the particular base station, may receive this message but be unable to successfully process the message due to inadequacies of the network infrastructure. The inability of the network to successfully process the UE capability information messages may cause a poor user experience.

FIG. 4 shows a signaling diagram 400 for restricting the size of a UE capability information message according to the exemplary embodiments. As discussed above, the generation of the UE capability information message by the UE may be initiated by the network upon the transmission of the UE capability enquiry message to the UE. Thus, the signaling diagram 400 may relate to the UE 110, the LTE-RAN 120 and the eNB 120A.

In 405, the LTE-RAN 120 via the eNB 120A may transmit a UE capability enquiry message to the UE 110. The UE capability enquiry message is a request for the transfer of the UE radio access capabilities. It should be noted that the UE capability enquiry message may be transmitted to the UE 110 when the UE 110 and the LTE-RAN 120 are attempting to enter a RRC Connected mode. Therefore, the transmission of the UE capability enquiry message by the eNB 120A may be triggered by another event that occurs during the setup of the RRC connection, such as an attach request from the UE 110, a request to establish an RRC connection from the UE 110, the transmission of NAS related data from the UE 110, etc. However, it is important to note that the exemplary embodiments do not require that the UE 110 trigger the transmission of the UE capability enquiry message. Instead, the LTE-RAN 120 may make a determination, independent from the UE 110, to transmit the UE capability enquiry message to the UE 110.

The UE 110 may receive the UE capability enquiry message via the transceiver 116. The message indicates to the UE 110 that the LTE-RAN 120 is requesting that the UE provide to the LTE-RAN 120, via the eNB 120A, the UE capability information.

In 410, the eNB 120A may transmit a UE capability information size limit message. This size limit message indicates to the UE 110 the maximum size of a UE capability information message that that the eNB 120A may receive and successfully process. It should be noted that reference to a UE capability information size limit message is merely exemplary. The exemplary embodiments may incorporate any type of indication corresponding to the size limit of the UE capability information message that a network can successfully process.

The UE capability information size limit message may be transmitted as part of the UE capability enquiry message or the UE capability information size limit message may be transmitted as an additional SI transmission. It should be noted that the above examples of the UE capability information size limit message are for illustrative purposes and the UE capability size limit message may be any type of transmission. Alternatively, the UE capability information message does not have to be an explicit indication of a size limit. Instead, the UE capability information size limit message may merely be an indication of the network infrastructure or location and based on the indication the UE may reference stored information to determine the corresponding UE capability information size limit. The UE capability information size limit message may include or be based on Original Equipment Manufacturer (OEM) defined parameters. The OEM defined parameters may correspond to the limitations of the network infrastructure's hardware, firmware, software etc.

In another exemplary embodiment, the eNB 120A may indicate the maximum size of a UE capability information message that that the eNB 120A may receive and successfully process in a MAC CE that is exchanged between the eNB 120A and the UE 110 during the establishment of the MAC layer. It should be noted that reference to a single MAC CE is merely for illustrative purposes and the exemplary embodiments may utilize a plurality of MAC CE.

The UE 110 may receive the UE capability information size limit message via the transceiver 116. This message indicates to the UE 110 that the LTE-RAN 120 may not be able to successfully process a UE capability information message that exceeds the indicated size limit (e.g. bytes). Thus, when the UE 110 generates the UE capability information message, the UE 110 generates a UE capability information message that does not exceed the size limit indicated by the LTE-RAN 120 via the UE capability information size limit message. If the UE capability information size limit message is received as a MAC CE, the UE 110 may cache this MAC CE and associate the MAC CE with a location. The UE capability information application 118 may re-use the cached MAC CE when generating the UE capability information message. For example, the UE 110 may store the MAC CE in the memory arrangement 114 and associate the information received in the MAC CE with a particular Tracking Area (TA). Subsequently, this may allow the UE 110 to determine whether the LTE-RAN 120 has indicated a size limit corresponding to successful processing a UE capability information message based on a location (e.g. TA).

In 415, based on the reception of the UE capability enquiry message transmitted in 405 and the UE capability information size limit message transmitted in 410, the UE 110 generates and transmits a UE capability information message. The UE capability information message transmitted to the eNB 120A may not exceed the size limit indicated in the UE capability information size limit message. For example, the UE capability information size limit message may indicate to the UE 110 that the LTE-RAN 120 via the eNB 120A cannot successfully process any UE capability information message that exceeds 1500 bytes. Accordingly, despite the size limit identified in the Standard and the UE 110 having the ability to generate a UE capability information message up to 8000 bytes, the UE 100 will not generate a UE capability enquiry message that exceeds 1500 bytes because the UE 110 is aware that, in this exemplary scenario, a UE capability information message that exceeds 1500 bytes cannot be successfully processed by eNB 120A.

FIG. 5 shows a method 500 for restricting the size of the UE capability information message according to the exemplary embodiments. The method 500 may relate to the signaling diagram 400. As discussed above, following the reception of the UE capability enquiry message and the UE capability information size limit message from the network, the UE 110 may restrict the size of the UE capability information message in accordance with the limit indicated in the UE capability information size limit message. Thus, the method 500 is performed by the UE 110 and the method 500 will be described with regard to the signaling diagram 400 of FIG. 4.

In 505, the UE 110 receives a UE capability enquiry message. The UE capability enquiry message may be an RRC message that indicates a request for the UE 110 to provide the radio access capabilities of the UE 110 the LTE-RAN 120.

In 510, the UE receives a UE capability information size limit message. The UE capability information size limit message may be included within the UE capability enquiry message, as a separate transmission from the LTE-RAN 120 or as a MAC CE during the establishment of the MAC layer between the UE 110 and the eNB 120A.

The UE capability information size limit message may indicate a size limit (e.g. bytes) for a UE capability information message. This UE capability information message may be generated by the UE 110 in response to the reception of the UE capability enquiry message and the size limit may be based on the UE capability information size limit message. For example, if the UE capability information size limit message indicates that the LTE-RAN 120 may not be able to successfully process a UE capability information message that exceeds 1500 bytes the UE 110 may determine that the size limit of the UE capability information message will not exceed 1500 bytes. As mentioned above, the UE 110 may be predefined to conventionally generate a larger message (e.g. 8000 bytes). For example, the current standard may set a maximum size limit for a UE capability information message at 8000 bytes. Therefore, the UE 110 restricts the size limit of the UE capability information message from being the predefined size and limits the UE capability information message to not exceed the size indicated in the UE capability information size limit message.

In an alternative embodiment, the UE 110 may determine the size limit for the UE capability information message without receiving a UE capability information size limit message corresponding to the UE capability enquiry message received in 505. As mentioned above, when the UE 110 receives the UE capability information size limit message in the form of a MAC CE, the UE 110 may cache the corresponding size limit and associate the size limit with a particular TA. Thus, when the UE 110 is in a TA that has a corresponding cached size limit, the UE 110 may determine the size of a UE capability information message based on only the cached information and without receiving the UE capability information size limit message in 510.

In 515, the UE 110 may determine the contents of the UE capability information message. The UE capability information message may include, but is not limited to, the radio access capabilities of the UE 110 in regard to LTE-RAN 120, the radio access capabilities of the UE 110 in regard to other radio access technologies (e.g. 5G NR-RAN 122, legacy networks, etc.), CA related measurements, the advertisement of CA combinations, SI related to CA capability, MIMO related features, etc. It should be noted that the description of the data related to the UE capability information message is merely for exemplary purposes. The UE capability information message may contain any information related to the UE 110 radio access capabilities.

The UE 110 may restrict the contents that are conventionally contained within a UE capability information message to ensure that the UE capability information message satisfies the size limit indicated in 510. For example, conventionally, the UE capability information message includes CA combination advertisements and the UE 110 may have predefined parameters that include a specific number of advertisement slots available for CA combinations (e.g. LTE Standard defines 128 advertisement slots) to be advertised within the UE capability information message. Thus, in 515 the UE 110 may determine that the contents of the UE capability information message will include less CA combinations than the available CA advertisement slots indicated by the predefined parameters (e.g. less than 128 advertisement slots defined in the LTE standard) to ensure that the message satisfies the size limit indicated in 510.

The UE 110 may determine which particular CA combinations to remove from the conventional CA capability information message in a variety of ways. For example, the UE 110 may first determine all of the possible CA combinations. Next, the UE 110 may determine an order for the CA combinations based on a set of priorities and order the CA combinations based on the priorities. For example, the UE 110 may designate a particular priority to triple CA combinations, double CA combinations, CA combinations that include combinations that utilize LAA, CA combinations that support higher modulation schemes (e.g. 256 QAM), etc. Accordingly, the UE 110 may determine which CA combinations to include in the UE capability information message based on the assigned priority order and the size limit indicated in 510. Including CA combinations based on the assigned priority order may allow the UE 110 to ensure that the UE 110 advertises CA combinations that utilize a certain aspect of CA when establishing a connection with the network. It should be noted that the examples provided above regarding assigned priority order are merely exemplary and the UE 110 may prioritize any aspect of CA when determining which particular CA combinations to remove from the conventional CA capability information message.

It should be further noted that the use of a priority order is merely for exemplary purposes. The UE 110 may determine which CA combinations to include based on any prioritized format or the UE 110 may determine which CA combinations to include in the CA capability information message in any manner as long as the message satisfies the size limit indicated in 510. For example, the UE 110 may determine the contents based on a prioritized format, an emergency call situation, a past operating history of the UE 110, currently camped PLMN, LAA CA, modulation schemes, etc. Alternatively, the UE 110 may determine to only advertise the CA combinations that utilize LAA.

Another exemplary embodiment relates to a scenario where the UE 110 has initiated an emergency call. Given this exemplary scenario, in 515, the UE may determine the contents of the UE capability information message based on disabling CA combination advertisements. Accordingly, the UE 110 will advertise itself as a non-CA capable device. CA combinations do not relate to emergency call functionality and thus including the CA combinations in an emergency call related UE capability information message is unnecessary. Thus, when placing an emergency call, the UE 110 may determine that the contents of the UE capability information message will not include CA combinations.

It should also be noted that the CA combinations are not the only aspect of a CA capability information message that may be restricted to ensure that the CA capability information message satisfies the size limit indicated in 510. For example, the UE 110 may determine to include only a portion of the MIMO related features conventionally included or only include SI related to a particular type of network. Thus, the UE 110 may manage the size of the UE capability information mention in any manner.

In 520, the UE 110 generates a UE capability information message that satisfies the size limit indicated in 510. The UE 110 may determine the contents of the UE capability information message in any manner as long as the contents of the message satisfy the size limit indicated in 510. In 525, the UE 110 transmits the UE capability information message to the LTE-RAN 120 via the eNB 120A.

Figure 6:
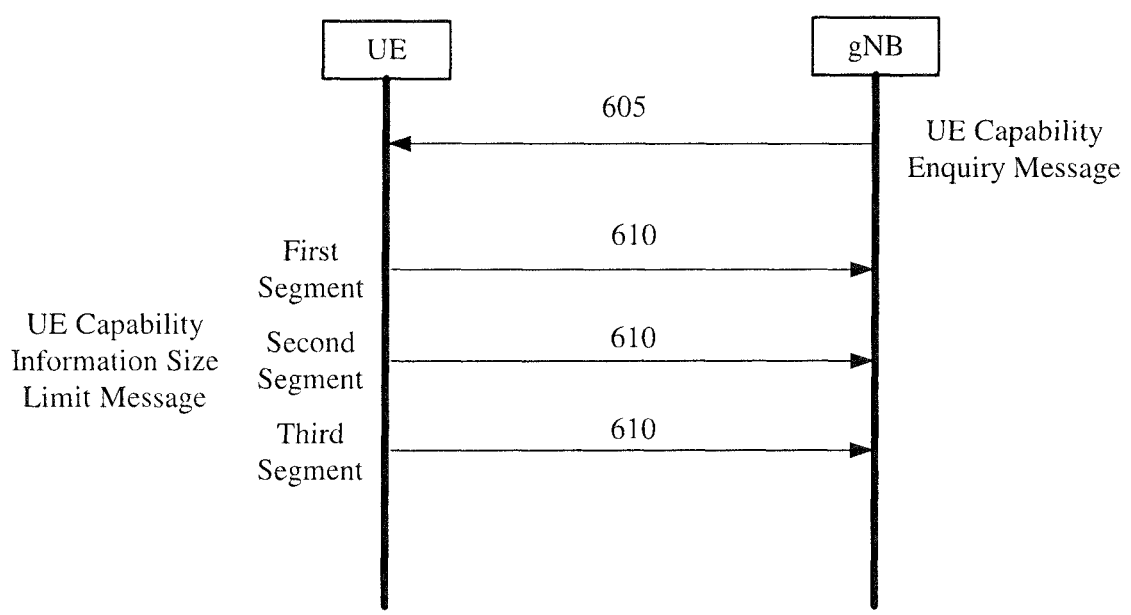
FIG. 6 shows a signaling diagram for restricting the size of the UE capability information message according to various exemplary embodiments described herein.
Figure 7:
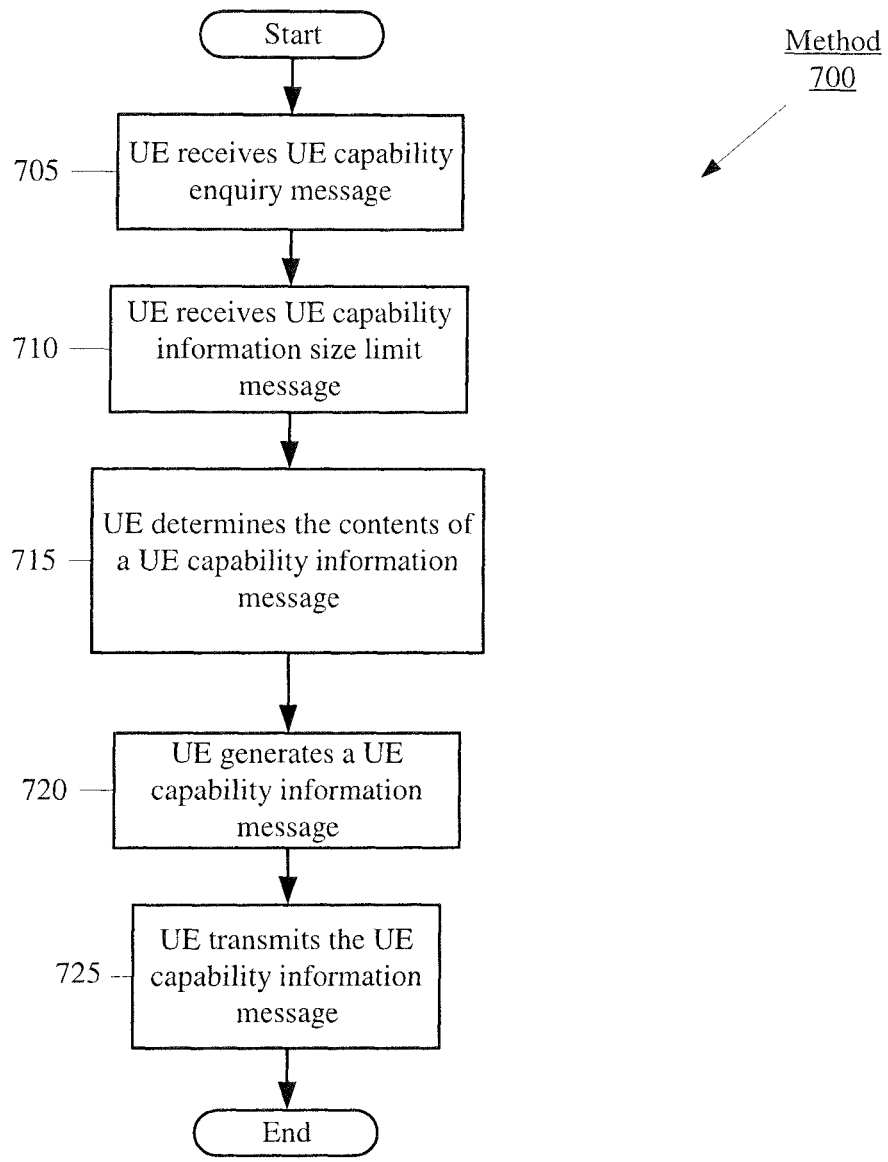
FIG. 7 shows a method for restricting the size of the UE capability information message according to various exemplary embodiments described herein.

As will be demonstrated below, FIG. 6 shows an exemplary signaling diagram 600 and FIG. 7 shows a corresponding method 700 for restricting the size of the UE capability information message when the UE 110 is associated with a gNB of a 5G NR network. However, reference to the 5G NR network is merely exemplary and the signaling diagram 600 and the method 700 may be performed when the UE 110 is associated with a eNB of a LTE network or any other type of network.

FIG. 6 shows a signaling diagram 600 for restricting the size of a UE capability information message according to the exemplary embodiments. As discussed above, the generation of the UE capability information message by the UE 110 may be initiated by the network upon the transmission of the UE capability enquiry message to the UE 110. Thus, the signaling diagram 600 may relate to the UE 110, the 5G NR-RAN 122 and the gNB 122A.

Initially, in 605 the 5G NR-RAN 122 via the gNB 122A may transmit a UE capability enquiry message to the UE 110. The UE capability enquiry message indicates to the UE 110 that the 5G NR-RAN 122 is requesting that the UE provide to the 5G NR-RAN 122 the UE capability information. In this exemplary embodiment, the UE capability enquiry message may include a UE capability information size limit message which indicates to the UE 110 the maximum size of a UE capability information message that that the gNB 122A may receive and successfully process. Additionally, the UE capability information size limit message may include an indication of a number of segments the 5G NR-RAN 122 can successfully process. The 5G NR-RAN 122 may also include a request for the UE 110 to identify each segment and set of segments with a particular segment and sequence identifier when the UE 110 generates the UE capability information message. It should be noted that the request for the identifier may not be included in the UE capability information size limit message and may be transmitted to the UR 110 in any manner.

Each segment indicated in the UE capability information size limit message may have the same size limit relative to each other. For example, if the UE capability information size limit message indicates that the size limit is 1500 bytes and the number of segments is equal to three, each segment has the size limit of 1500 bytes. Thus, the 5G NR-RAN 122 may successfully process a first segment of a UE capability information message with a size limit of 1500 bytes, a second segment of UE capability information message with a size limit of 1500 bytes and a third segment of a UE capability information message with a size limit of 1500 bytes. Thus, the 5G NR-RAN may successfully process up to 4500 bytes of UE capability information message. It should be noted that reference to a UE capability information size limit message is merely exemplary. The exemplary embodiments may incorporate any type of indication corresponding to the size of the UE capability information message and the number of segments that a network can successfully process. Alternatively, the UE capability information size limit message may be transmitted after the transmission of the UE capability enquiry message as an additional transmission. It is also important to note that the UE 110 is not required to use the maximum amount of bytes or the maximum number of segments indicated by the network in the UE capability enquiry message.

The UE 110 may receive the UE capability enquiry message and the UE capability information size limit message via the transceiver 116. These messages indicate to the UE 110 that the 5G NR-RAN 122 may not be able to successfully process a UE capability information message that exceeds the specified size limit (e.g. bytes) or exceeds the specified number of segments. Thus, when the UE 110 generates the UE capability information message, the UE 110 generates a UE capability information message that does not exceed the size limit nor exceeds the number of segments that are identified by the indication received from the LTE-RAN 120.

In 610, based on the reception of the UE capability enquiry message and the UE capability information size limit message, the UE 110 generates and transmits a UE capability information message. The UE capability information message transmitted to the gNB 122A may not exceed the size limit nor the number of segments indicated in the UE capability information size limit message. For example, the UE capability information size limit message may indicate to the UE 110 that the 5G NR-RAN 122 via the gNB 122A cannot successfully process any UE capability information messages that exceed 1500 bytes and cannot process a number of segments that exceeds three. Accordingly, the UE 110 will generate and transmit a first segment of 1500 bytes, a second segment of 1500 bytes and a third segment of 1500 bytes. It should be noted that the segments may be transmitted continuously in time and on the same frequency, continuously in time and on different frequencies, separated in time or a combination thereof.

In another example, the UE capability information size limit message may indicate to the UE 110 that the size limit is 1500 bytes and the segment limit is five. However, in this example, the UE 110 may only have 4500 bytes of UE capability information to transmit. Accordingly, the UE 110 may generate and transmit a first segment of 1500 bytes, a second segment of 1500 bytes and a third segment of 1500 bytes. Thus, despite the segment limit being five segments the UE 110 may only utilize three segments because the UE 110 is able to transmit the 4500 bytes of UE capability information over three segments.

In another example, the UE 110 may have 1000 bytes of UE capability information to transmit and the UE capability information size limit message may indicate to the UE 110 that the size limit is 100 bytes and the segment limit is six. In this scenario, the UE 110 may reduce the CA capability information to 600 bytes and may transmit 600 bytes over the six segments. Accordingly, the UE 110 may generate and transmit a first segment of 100 bytes, a second segment of 100 bytes, a third segment of 100 bytes, a fourth segment of 100 bytes, a fifth segment of 100 bytes and a sixth segment of 100 bytes.

The 5G NR-RAN 122 via the gNB 122A may receive the segments of the UE capability information messages and aggregate the segments to determine the UE 110 radio access capability and support features. It should be noted that the UE capability enquiry message, the UE capability information size limit message and the UE capability information message may each be part of a RRC protocol or any type of connection procedure between the UE 110 and the 5G NR-RAN 122.

FIG. 7 shows a method 700 for restricting the size of and the number of segments of the UE capability information message according to the exemplary embodiments. The method 700 may relate to the signaling diagram 600. As discussed above, following the reception of the UE capability enquiry message and the UE capability information size limit message from the network, the UE 110 may restrict the size of the UE capability information message in accordance with the size limit and number of segments indicated in the UE capability information size limit message. Thus, the method 700 is performed by the UE 110 and the method 700 will be described with regard to the signaling diagram 600 of FIG. 6.

In 705, the UE 110 receives a UE capability enquiry message. The UE capability enquiry message may be a message that indicates a request from the 5G NR-RAN 122 for the UE 110 to provide the radio access capabilities of the UE 110 to the 5G NR-RAN 122.

In 710, the UE receives a UE capability information size limit message. The UE capability information size limit message may indicate a size limit and number of segments that corresponds to a size limit and number of segments of a UE capability information message that the 5g NR-RAN 122 may successfully process. For example, the UE capability information size limit message may indicate that the 5G NR-RAN 122 may be able to successfully process three segments, each with a size limit of 1500 bytes. The UE capability information size limit message may be included within the UE capability enquiry message or may be included in a separate message from the 5G NR-RAN 122.

In 715, the UE 110 may determine the contents of the UE capability information message. The UE capability information message may include, but is not limited to, the radio access capabilities of the UE 110 in regard to 5G NR-RAN 122, the radio access capabilities of the UE 110 in regard to other radio access technologies (e.g. LTE-RAN 120, legacy networks, etc.), CA related measurements, the advertisement of CA combinations, SI related to CA capability, MIMO related features, etc. It should be noted that the description of the data related to the UE capability information message is merely for exemplary purposes. The UE capability information message may contain any information related to the UE 110 radio access capabilities. Accordingly, the UE 110 may determine the contents of the UE capability information message based on the size limit and segment limit received in the UE capability enquiry message.

As mentioned above with reference to FIG. 5, the UE 110 may determine the contents of the UE capability information message in a variety of ways. The UE 110 may determine the contents based on a prioritized order, an emergency call situation, a past operating history of the UE 110, currently camped PLMN, LAA CA, modulation schemes, etc.

In 720, the UE 110 generates the UE capability information message in accordance with the size limit and the segment limit. Thus, to continue the example provided in 710, the UE 110 constructs a first segment containing no more than 1500 bytes, a second segment containing no more than 1500 bytes and a third segment containing no more than 1500 bytes. Each segment may have its own segment and sequence number for the 5G NR-RAN 122 to identify that the UE 110 sent the first segment, second segment and third segment to the network. Specifically, each segment will have an indication that identifies that the segment is part of a set of segments. Each set of segments may have a sequence number to identify the set of segments. The network may determine the segment and sequence number based on information the network provided to the UE 110. Alternatively, the UE 110 may determine the segment and sequence number and then identify the segment and sequence in a signal transmitted to the network prior to the transmission of the UE capability information message.

The gNB 122A will receive the segments from the UE 110. The 5G-NR RAN 122 may aggregate the received segments to determine the contents of the UE capability information message. As mentioned above, the segment and sequence number allows the 5G NR-RAN to identify that the segments correspond to the UE 110.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claim is:

1. A method, comprising:
    at a user equipment (UE):
    receiving a request from a network for radio access capabilities of the UE;
    receiving, from the network, a maximum size limit indication corresponding to a message to be generated by the UE that includes the radio access capabilities of the UE, wherein the maximum size limit indication is indicative of a maximum size of a message that the network can receive and successfully process;
    generating the message that includes the radio access capabilities based on the maximum size limit; and
    transmitting the message to the network.

2. The method of claim 1, wherein the maximum size limit indication is included in one of the request or a separate message from the network.

3. The method of claim 1, wherein the maximum size limit indication is transported via a Medium Access Control (MAC) layer.

4. The method of claim 1, wherein the request and maximum size limit indication are received as part of a common message that is associated with a connection procedure.

5. The method of claim 4, wherein the connection procedure is for an emergency call and wherein the message that includes the radio access capabilities does not include carrier aggregation capabilities.

6. The method of claim 1, wherein generating the message includes determining a plurality of available carrier aggregation (CA) combinations, assigning a first priority to CA combinations that utilize license assisted access (LAA) and generating a prioritized format of the plurality of available CA combinations based on the first priority and the maximum size limit.

7. The method of claim 6, wherein the prioritized format includes less CA combinations than a number of slots available for CA combinations.

8. A user equipment (UE), comprising:
    a processor configured to:
    receive a request from a network for radio access capabilities of the UE;
    receive, from the network, a maximum size limit indication corresponding to a message to be generated by the UE that includes the radio access capabilities of the UE, wherein the maximum size limit indication is indicative of a maximum size of a message that the network can receive and successfully process; and
    generate the message that includes the radio access capabilities based on the maximum size limit; and
    a transceiver configured to transmit the message to the network.

9. The UE of claim 8, wherein the maximum size limit indication is transported via a Medium Access Control (MAC) layer.

10. The UE of claim 8, wherein the processor is further configured to determine a number of available slots available for carrier aggregation (CA) combinations and wherein the message includes less CA combinations than the number of available slots.

11. A method, comprising:
    at a user equipment (UE):
    receiving a request from a network for radio access capabilities of the UE;
    receiving a segment limit indication and a maximum size limit indication for a message to be generated by the UE that includes the radio access capabilities of the UE, wherein the segment limit indication and the maximum size limit indication are indicative of a maximum number of segments and a maximum size of a message that the network can receive and successfully process;
    generating the message that includes the radio access capabilities of the UE, wherein the message includes a plurality of segments based on the segment limit and the maximum size limit; and
    transmitting the message to the network.

12. The method of claim 11, wherein the maximum size limit indication is included in one of the request or a separate message from the network.

13. The method of claim 11, wherein the segment limit indication is included in one of the request or a separate message from the network.

14. The method of claim 11, wherein the segment limit indication and the maximum size limit indication are part of a connection procedure.

15. The method of claim 11, wherein the request is part of a connection procedure for an emergency call and wherein the message that includes the radio access capabilities does not include carrier aggregation capabilities.

16. The method of claim 11, wherein generating the message includes determining a plurality of available carrier aggregation (CA) combinations, assigning a first priority to a first parameter corresponding to CA combinations and generating a prioritized format of the plurality of available CA combinations based on the first priority and the maximum size limit.

17. The method of claim 16, wherein the first parameter is one of license assisted access (LAA) functionality, a number of Second Cells (SCells) and a type of modulation scheme.

18. The method of claim 16, wherein the prioritized format includes less CA combinations than a number of slots available for CA combinations.

19. The method of claim 18, wherein a difference between the number of slots available for CA combinations and a number of CA combinations included in the prioritized format is based on the maximum size limit.

20. A user equipment (UE), comprising:
    a processor configured to:
    receive a request from a network for radio access capabilities of the UE;

receive a segment limit indication and a maximum size limit indication for a message to be generated by the UE that includes the radio access capabilities of the UE, wherein the segment limit indication and the maximum size limit indication are indicative of a maximum number of segments and a maximum size of a message that the network can receive and successfully process; and generate the message that includes the radio access capabilities, wherein the message includes a plurality of segments based on the segment limit and the maximum size limit; and a transceiver configured to transmit the message to the network.

\* \* \* \* \*